United States Patent [19]

Ohkura

[11] Patent Number: 4,993,507

[45] Date of Patent: Feb. 19, 1991

[54] METHOD OF CONTROLLING OPERATION OF AUTOMATED GUIDED VEHICLE

[75] Inventor: Akira Ohkura, Aichi, Japan

[73] Assignee: Toyota Jidosha Kabushiki Kaisha, Toyota, Japan

[21] Appl. No.: 439,010

[22] Filed: Nov. 20, 1989

Related U.S. Application Data

[63] Continuation of Ser. No. 192,720, May 11, 1988, abandoned.

[51] Int. Cl.⁵ .................. B62D 1/26; G06F 15/50
[52] U.S. Cl. ..................... 180/168; 318/587; 340/936; 364/424.02; 364/426.01
[58] Field of Search .......... 180/167, 168, 169; 246/182 R; 318/587; 340/438, 439, 459, 936; 364/424.01, 424.02, 426.01, 440

[56] References Cited

U.S. PATENT DOCUMENTS

| | | | |
|---|---|---|---|
| 3,378,102 | 4/1968 | Collin et al. | 180/167 |
| 3,669,206 | 6/1972 | Tax et al. | 180/168 |
| 3,768,586 | 10/1973 | Thompson et al. | 180/168 |
| 4,595,331 | 6/1986 | Thompson et al. | 180/168 X |
| 4,716,530 | 12/1987 | Ogawa et al. | 180/168 X |
| 4,780,817 | 10/1988 | Lofgren | 180/168 X |
| 4,817,750 | 4/1981 | Ishida et al. | 180/168 |

FOREIGN PATENT DOCUMENTS 0229669 7/1987 European Pat. Off. ............ 180/168
60-137476 7/1985 Japan .

OTHER PUBLICATIONS

"Automation" (published by Nikkan Kogyo Shinbun Shia in 1986, vol. 31, No. 8, pp. 52-56).
"Material Handling Engineering" (published by Penton-Ipc in U.S.A., 1985, pp. 52-56).

Primary Examiner—Charles A. Marmor
Assistant Examiner—Brian L. Johnson
Attorney, Agent, or Firm—Finnegan, Henderson, Farabow, Garrett and Dunner

[57] ABSTRACT

A method of controlling the operation in a factory of an A.G.V. which automatically travels along a predetermined route consisting of a plurality of production lines having different line contacts and adapted to perform parts assembly or packaging. Optimum travel speeds with respect to all the lines are previously stored in the A.G.V. When the A.G.V. enters one of the production lines, it is instructed from the outside to travel constantly at a previously stored speed assigned to this production line. Thus, operations of the production line are successively performed.

1 Claim, 3 Drawing Sheets

METHOD OF CONTROLLING OPERATION OF AUTOMATED GUIDED VEHICLE

This application is a continuation of application Ser. No. 192,720, filed May 11, 1988, now abandoned.

BACKGROUND OF THE INVENTION

1. Field of the Invention

This invention relates to a method of controlling the operation of an Automated Guided Vehicle (hereinafter abbreviated to A.G.V.) used as a means of transportation for production line work performed in a machine manufacturing works.

2. Description of Prior Art

In general, production line work in a machine manufacturing works, such as an automobile manufacturing works, is usually performed with a conveyor system. In particular, with respect to production line work, mainly consisting of manual operations, the relevant operations are usually performed by using a conveyor system. This is because a well-paced performance, based on the continuous flow of a conveyor, is regarded as important.

However, a production line used with a conventional an ordinarily conveyor system ordinarily involves a number of work stages, and the length of the production line is inevitably quite considerable. The size of the installation is thus correspondingly increased; and it is difficult to provide paths for the movement of workers and the supply of parts. Such a conveyor system is also defective in terms of adaptability to changes in the overall layout of the works.

The introduction of A.G.V.'s to parts assembly lines, or parts packaging lines, is currently being eagerly studied as an alternative to the use of conveyor systems. Examples of an technique allowing such applications are disclosed in Japanese Patent Laid-Open No. 60-137476, "AUTOMATION" (published by Nikkan Kogyo Shinbun Shia in 1986, Vol. 31, No. 8, pp 36–42), and "MATERIAL HANDLING ENGINEERING" (published by PENTON-IPC in USA,1985, pp 52–56).

In all the techniques for introduction of A.G.V.'s disclosed in these documents, the speed at which an A.G.V. travels is constant, and an operation of assembling or packaging parts is performed each time the vehicle stops at a station for a predetermined period of time. Consequently, such a vehicle system cannot serve as a way of maintaining a desired pace, and cannot constantly maintain a certain level of working hours and production line speed, thus resulting in a lowering of production efficiency.

In the system disclosed in Japanese Patent Laid-Open No. 60-137476, the stopping time at each station is controlled in accordance with the time taken by each work stage in a production line. In this system, lamps may be provided at each station in order to inform workers of the passage of working time or the time remaining for the given task. However, this system cannot serve to maintain a certain pace commensurate with the performance of production line work since the pace keeping function of this system does not become second nature to a person, like the continuous flow of a conveyor system. There is a possibility that, it will result in non-uniform tasks. There is also a problem in that the administrator or supervisor cannot ascertain the progress of operation as being either ahead of, or behind time, relative to a standard.

SUMMARY OF THE INVENTION

A general technical concern of the present invention is toward solving certain problems relating to the introduction of A.G.V.s to an assembly or packaging line, based on the above-described conventional techniques; and an object of the present invention is to provide an improved method of controlling the operation of an A.G.V., a method of providing a pace keeping function similar to that of a conveyor system, while utilizing the benefits of introducing A.G.V.'s, and a method also serving to positively improve the production efficiency, thereby making a substantial contribution to the field of production line transportation techniques.

To this end, the present invention provides a method in which optimum travel speeds with respect to all production lines having different line contacts are previously stored in a speed control unit of an A.G.V.; a speed change command is supplied from the outside so as to change the speed of the A.G.V. to the optimum speed assigned to one of the production lines when the A.G.V. enters this production line; production line operations are performed while the A.G.V. continuously travels along the line constantly at the speed assigned to this line; and the A.G.V. starts to travel at the original speed (out-of-line travel speed) at the end of the line of travel.

In accordance with the present invention, it is preferable to set the out-of-line travel speed of the A.G.V. higher than the line travel speed at which the vehicle travels along each line.

The present invention enables a pace keeping function similar to that of a conveyor system while utilizing the benefits of introducing A.G.V., such as an increase in the degree of freedom in relation to changes in the layout in the factory; and an improvement in space utilization efficiency, thereby positively improving the production efficiency of the production line work.

A system in accordance with the present invention is designed in such a manner that a speed control device is mounted on the A.G.V. Optimum travel speeds, with respect to all of the production lines having different line contacts, are stored in the speed control device. A speed change command is supplied from the outside to the speed control device, so as to change the speed of the A.G.V. to a set speed assigned to one of the production lines, when the A.G.V. enters this line. This eliminates the need for the provision of a large installation, such as, conveyor system; and ensures that the system, in accordance with the present invention can be adapted to changes in the layout in the factory by simply changing the operation route of the A.G.V. Since the A.G.V. can always continuously travel at a constant and low speed in a production line, it effects a positive pace making performance equivalent to that of a conveyor system during a production line process.

The method of mounting the speed control device of the A.G.V., storing optimum travel speeds in the speed control device, and assigning to the A.G.V. the speed corresponding to a production line in which the vehicle travels, enables a type of A.G.V. to be used in a plurality of production lines, thereby increasing the degree of freedom relative to different types of production line, as well as mass production of A.G.V.s and, hence, a reduction in installation costs.

BRIEF DESCRIPTION OF THE DRAWINGS

The accompanying drawings illustrate an embodiment of the present invention.

DESCRIPTION OF THE PREFERRED EMBODIMENT

An embodiment of the present invention will be described below with reference to the accompanying drawings.

Figure 1:
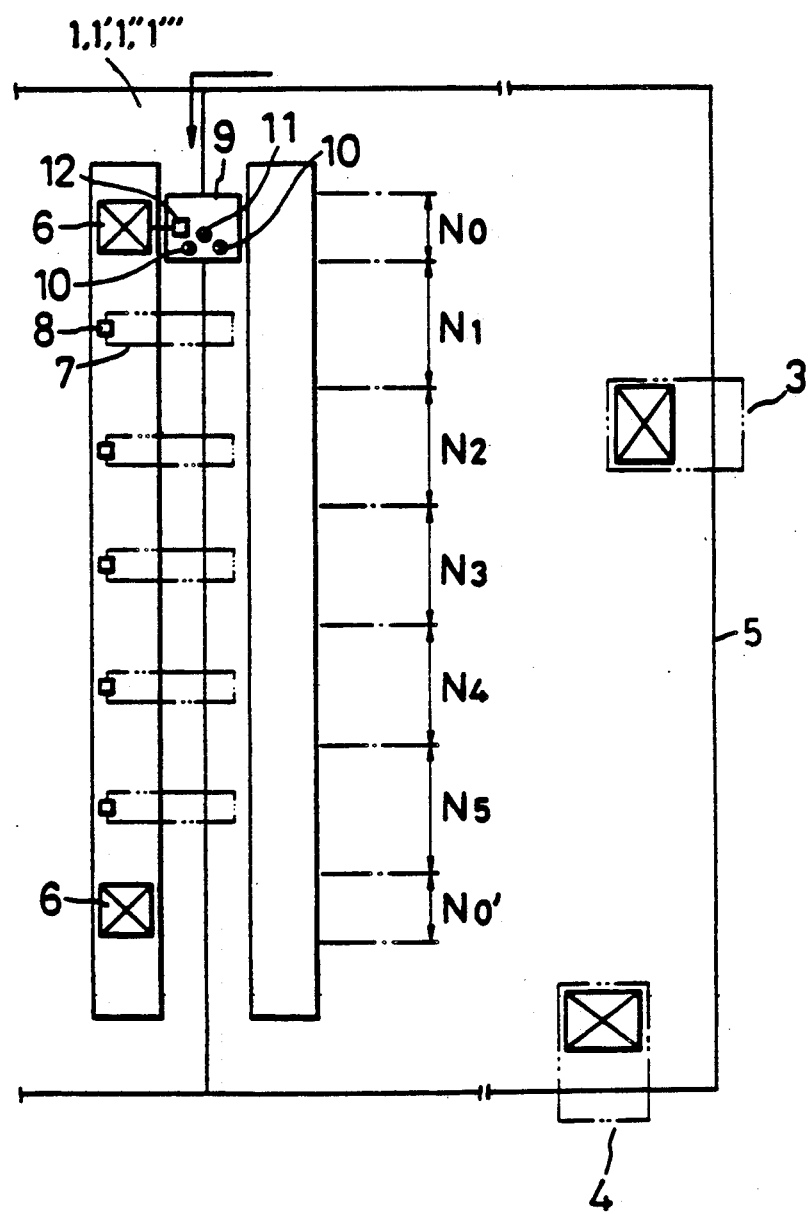
FIG. 1 is a schematic plan view of a part of the layout in a factory.
Figure 2:
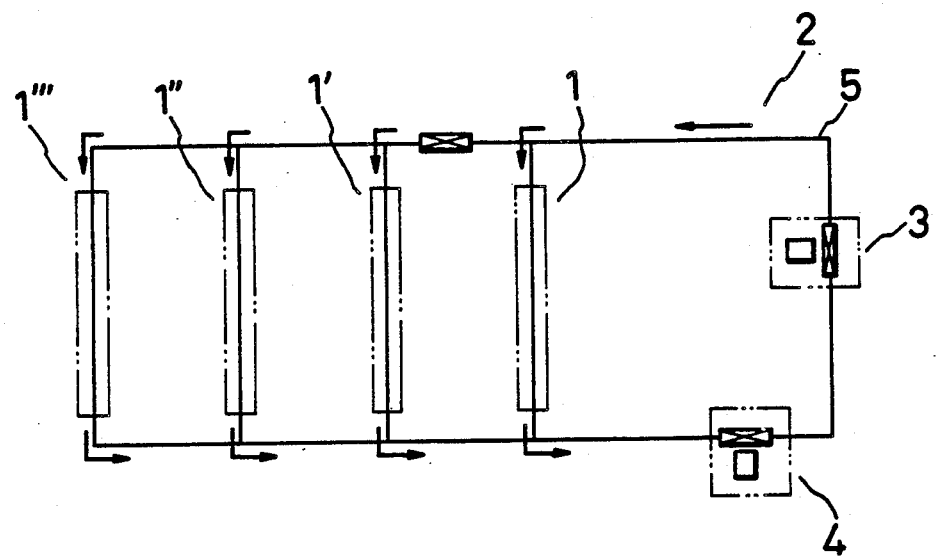
FIG. 2 is a schematic plan view of the whole of the layout shown in FIG. 1.
Figure 3:
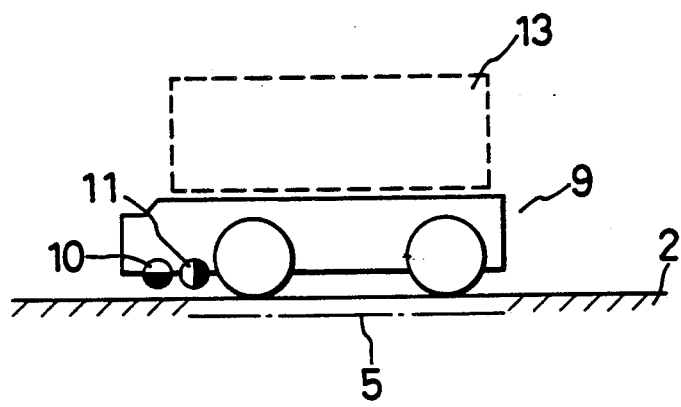
FIG. 3 is a schematic side view of an A.G.V.

Referring to FIGS. 1 to 3, work lines 1, 1', 1'', 1''' for parts assembly and packaging are provided in a factory.

Desired parts to be assembled or packed and devices used for desired operations are disposed along the work lines 1, 1', 1'', and 1'''.

A work-carry-in station 3 and a work-carry-out station 4 are disposed in desired positions on a floor 2. A travel guide wire (FIGS. 2 and 3) 5 or transportation line 5 is embedded in the floor 2 in such a manner that it forms a loop which connects the work or entrance station 3, the work-carry-out or exit station 4, and the work lines 1, 1', 1'', and 1'''. The travel guide wire 5 is connected to an oscillation amplifier (not shown) and is supplied with a low-frequency current of a desired frequency so that an electromagnetic field is generated around its outer circumference.

As shown in FIG. 1, command transmitting stations $N_0$ and $N_0'$ are disposed at the upstream and downstream ends of each of the the work lines 1, 1', 1'', and 1'''. The place between the command transmitting stations $N_0$ and $N_0'$ is sectioned into work stations $N_1$, $N_2$, $N_3$, $N_4$, and $N_5$. An optical command oscillator 6 is provided at each of the command transmitting stations $N_0$ and $N_0'$. A start-stop command guide wire 7 is embedded at each of the work stations $N_1$, $N_2$, $N_3$, $N_4$, and $N_5$ in such a manner that it extends across the travel guide wire 5 in the work lines 1, 1', 1'', and 1'''. The start-stop command wire 7 is connected to an oscillator (not shown) via a hold switch 8; and is supplied with a low-frequency current of a desired frequency different from that of the current supplied to the travel guide wire 5 so that it generates an electomagnetic field around its outer periphery.

An A.G.V. 9 has a travel motor (not shown) (such as one connected to a rotary encoder of a high resolution type for velocity feedback and to a controller) capable of being speed-controlled with accuracy, and a microcomputer (not shown) provided as a speed controller. The rotation of the motor is controlled on the basis of information issued from the microcomputer so that it is regulated at a set speed.

A pair of left and right pickup coils 10 responsive to the electromagnetic field produced by the travel guide wire 5 and a pickup coil 11 responsive to the electromagnetic field produced by each start-stop command guide wire 7 are disposed on an outside surface of the A.G.V. 9. The pickup coils 10 are electrically connected to a steering device (not shown), and steering is performed on the basis of the difference between electromotive forces induced in the left and right pickup coils 10. The pickup coil 11 is electrically connected to a power switch of the travel motor. The power supply to the travel motor is switched on or off in response to the occurrence or disappearance of an electromagnetic force induced in the pickup coil 11. The A.G.V. 9 is also provided with a light receiving device 12 which can face the optical command transmitter 6', and which is electrically connected to the microcomputer mounted on the A.G.V. 9.

Figure 4:
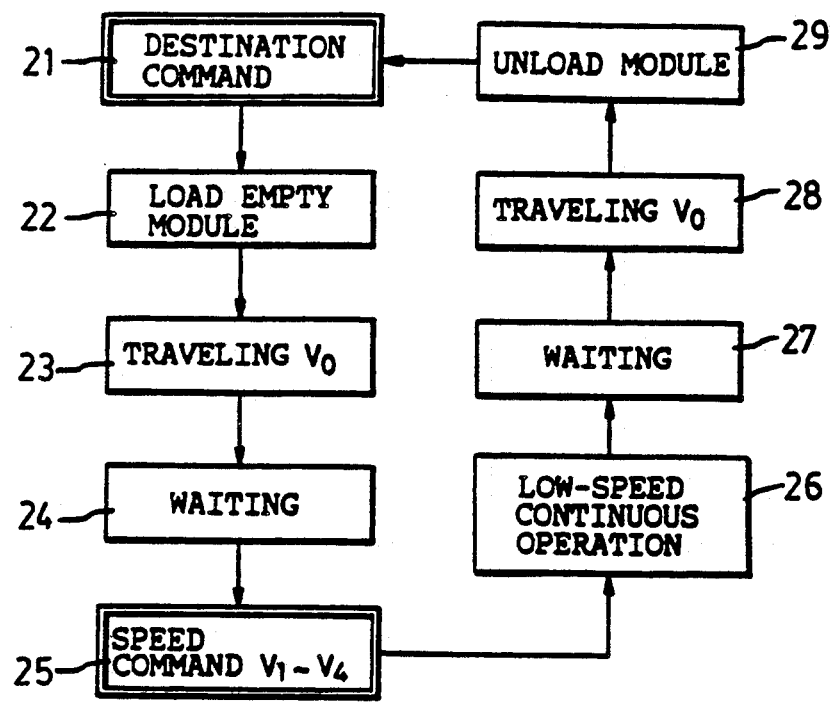
FIG. 4 is a flow chart of operation line control of the A.G.V.

In the thus-constructed installation, the operation of the A.G.V. in accordance with the present invention is controlled on the basis of a flow chart such as that shown in FIG. 4.

Optimum travel speeds with respect to all of the work lines 1, 1', 1'', and 1''' and would be generally equal to the speeds at which conveyors are continuously moved if the production line work were performed by conveyors. These speeds are previously input into the microcomputer mounted on the A.G.V. 9. After this preparation, and referring to FIG. 4 the place where the cart should travel is assigned by a controller (not shown) referred to a 21. Thereafter, the unmanned cart 9 is loaded with a desired work 13 (FIG. 3) at the line-carry-in station 3, as indicated at block 22 of FIG. 4; and is made to travel at a predetermined speed $V_0$ along the travel guide wire 5 in the factory as indicated by block 23.

The speed at which the unmanned cart 9 travels while being detected by the pickup coils 10 is determined by the electromagnetic field produced by the travel guide wire 5. This field is set to be comparatively high as in the case of the conventional A.G.V. The traveling route is determined by an external controller.

When the A.G.V. 9 enters one of the work lines (1, 1' 1'' or 1''') for which it has been waiting as indicated at block 24, a speed assignation command is issued from the optical command transmitter 6 provided in the command transmitting station $N_0$ at the entrance side of the work line 1, 1', 1'', 1''' as shown at block 25. The A.G.V. 9 receives this command by light receiving device 12, and accesses an optimum travel speed $V_1$, $V_2$, or $V_3$, $V_4$ of a respective work line 1, 1', 1'', or 1''' stored in the microcomputer. The controller regulates the rotational speed of the travel motor on the basis of the controller information, and the rotary encoder, thereby traveling at a desired low traveling speed, as shown in block 26.

Figure 5:
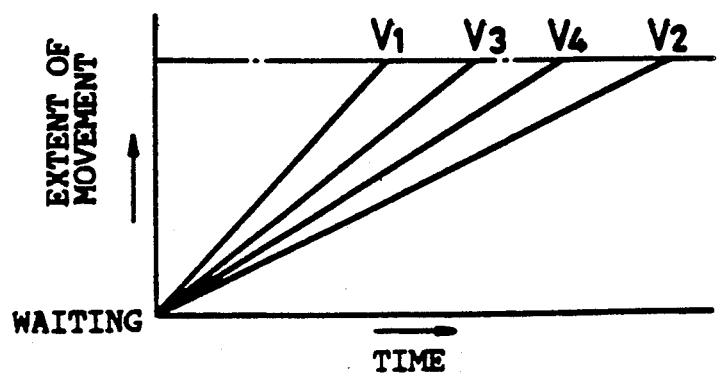
FIG. 5 is a graph of speeds of the unmanned cart at different production lines.

As shown in FIG. 5, the speed $V_1$ at which the A.G.V. 9 has been set to travel at a constant rate, which substantially equals the conveyor speed in the event a conveyor system is used. Thus, the worker waiting at each of the stations $N_1$ to $N_5$ can perform desired assembling or packaging operations at a pace perceived from the movement of the A.G.V. 9 traveling at a low speed.

After the assembling or packaging operations performed at the work stations $N_1$ to $N_5$ have been completed, the A.G.V. 9 receives a command from the optical transmitter 6 of the command transmitting station $N_0'$ at the exit side as shown in block 27. Then the speed at which the cart travels is returned to the speed $V_0$ as indicated by block 28. When the A.G.V. 9 reaches the work-carry-out station 4, the work which has undergone the assembling or packaging operations is unloaded as shown at block 29. The cart travels again to the work-carry-in station 3, and the above-described operation is repeated.

The workers engaged in the operations at the work stations $N_1$ to $N_5$ can stop the A.G.V. 9 as desired, for example, in times of emergency. In this case, one of the hold switches 8 provided in the stations $N_1$ to $N_5$ is operated so that an electromagnetic field occurs around the start-stop command wire 7. The travel motor is thereby stopped through the medium of the pickup coil 11. When the hold switch 8 is turned off, the generation of the electromagnetic field is terminated, and the travel motor of the A.G.V. 9 is thereby started again.

Needless to say, the present invention is not limited to the above-described embodiment, and other various modifications and alterations are possible. For instance, the device for sending a command to change the travel speed of the A.G.V. on each work line and the device for receiving this command may be replaced with a bar code and a bar code reader. Also, a conventional station stop method may be combined with the system in accordance with the present invention as desired.

What is claimed is:

1. A method of controlling the operation of an automated guided vehicle A.G.V. to carry workpieces along production lines to a plurality of successive work stations at a speed corresponding to a predetermined distinctive workpiece conveyor speed for the respective production line in a manufacturing area of a plant, comprising the steps of:

defining a boundary of the manufacturing area with a transportation line having a work load entrance station and a work load exit station;

providing a plurality of parallel spaced production lines, within the defined boundary;

providing a plurality of successively disposed work stations along each production line;

connecting the transportation line and each production line by a guide wire provided in the manufacturing area floor;

propelling the A.G.V. at a transportation line speed by detecting a magnetic field generated continuously from the transportation line to each of the production lines and from each production line to the transportation line;

generating a speed command signal adjacent the entrance and exit ends of each production line for controlling the A.G.V. entering and exiting a respective production line;

storing on the A.G.V. speed data corresponding to a predetermined distinct workpiece conveyor speed for each production line; each distinct workpiece conveyor speed being continuous and each being less than the transportation line speed through the work stations of each production line; each distinct workpiece conveyor speed being the desired speed for performing manufacturing operations at the work stations along each corresponding production line;

detecting on the A.G.V. the generated speed command signals of the corresponding entrance and exit end of the respective production line;

decreasing the speed of the A.G.V. from the transportation line speed to the respective stored speed for the corresponding production line until the speed of the A.G.V. is equal to the distinct workpiece conveyor speed in response to the generated speed command signal at the entrance end of a respective production line;

propelling the A.G.V. at the corresponding stored distinct workpiece conveyor speed along the production line continuously; and increasing the speed of the A.G.V. to the speed of the transportation line speed in response to the generated speed command signal at the exit end of the corresponding production line.

* * * * *